(12) United States Patent
Agostini et al.

(10) Patent No.: US 7,694,708 B2
(45) Date of Patent: Apr. 13, 2010

(54) TIRE WITH SIDEWALL INSERT

(75) Inventors: Giorgio Agostini, Colmar-Berg (LU);
Filomeno Gennaro Corvasce, Mertzig (LU); Christian Kaes, Schrondweiler (LU); Marc Weydert, Strassen (LU); Frank Schmitz, Bissen (LU); Anne Therese Peronnet-Paquin, Luxembourg (LU); Mercedes Maria Diaz-Scharfe, Mersch (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 467 days.

(21) Appl. No.: 11/881,540

(22) Filed: Jul. 27, 2007

(65) Prior Publication Data
US 2008/0083479 A1    Apr. 10, 2008

Related U.S. Application Data

(60) Provisional application No. 60/850,599, filed on Oct. 10, 2006.

(51) Int. Cl.
*B60C 1/00* (2006.01)
*B60C 17/00* (2006.01)
*B60C 17/04* (2006.01)

(52) U.S. Cl. ............... 152/516; 152/450; 152/520; 152/539; 152/555

(58) Field of Classification Search ............ 152/450, 152/516, 520, 539, 555
See application file for complete search history.

(56) References Cited

U.S. PATENT DOCUMENTS

| | | | | |
|---|---|---|---|---|
| 4,287,924 A | 9/1981 | Deck et al. | ............... | 152/153 |
| 4,371,483 A | 2/1983 | Mattson | ............... | 264/40.6 |
| 4,779,658 A | 10/1988 | Kawabata et al. | ............... | 152/517 |
| 5,238,040 A | 8/1993 | Ghilardi | ............... | 152/517 |
| 5,309,970 A | 5/1994 | Kawabata et al. | ............... | 152/517 |
| 5,526,862 A | 6/1996 | Ghilardi | ............... | 152/458 |
| 5,624,727 A | 4/1997 | Stoy | ............... | 428/76 |
| 5,626,698 A | 5/1997 | Tsuruta et al. | ............... | 152/541 |
| 5,872,188 A * | 2/1999 | Datta et al. | ............... | 525/150 |
| 5,979,527 A | 11/1999 | Kobayashi et al. | ............... | 152/525 |
| 6,135,183 A | 10/2000 | Oare et al. | ............... | 152/517 |
| 6,341,636 B1 | 1/2002 | Fujishiro | ............... | 152/523 |
| 6,422,279 B1 | 7/2002 | Williams et al. | ............... | 152/517 |

(Continued)

FOREIGN PATENT DOCUMENTS

EP    1669219 A1    6/2006

OTHER PUBLICATIONS

Search Report—Date of Completion—Jan. 14, 2008.

*Primary Examiner*—Justin Fischer
(74) *Attorney, Agent, or Firm*—John D. DeLong

(57) ABSTRACT

A pneumatic tire including a circumferential tread, two spaced apart beads, and sidewalls connecting said beads and tread, wherein said tire sidewall contains at least one internal annular sidewall insert including at least two annular segments, the at least two annular segments including first and second adjacent annular segments;
wherein said first and second annular segments are disposed with an interface therebetween;
wherein each of the at least two annular segments includes a rubber composition comprising at least one diene based rubber and at least one vulcanization modifier selected from the group consisting of α,ω-bis(N,N'-dihydrocarbylthiocarbamamoyldithio)alkanes, bismaleimides, and biscitraconimides; and
wherein the concentration of vulcanization modifier in the first annular segment is less than the concentration of vulcanization modifier in the second annular segment.

13 Claims, 7 Drawing Sheets

U.S. PATENT DOCUMENTS

| | | | |
|---|---|---|---|
| 6,453,961 B1 | 9/2002 | Colantonio et al. | 152/517 |
| 6,843,293 B1 | 1/2005 | Corvasce et al. | 152/516 |
| 2001/0001971 A1 | 5/2001 | Cottrell | 152/516 |
| 2005/0133135 A1 | 6/2005 | Corvasce et al. | 152/517 |

* cited by examiner

US 7,694,708 B2

TIRE WITH SIDEWALL INSERT

CROSS REFERENCE TO OTHER APPLICATIONS

This application claims the benefit of Ser. No. 60/850,599 filed Oct. 10, 2006.

BACKGROUND OF THE INVENTION

Tire constructions generally include a sidewall insert variously for support of the tire sidewall. In the case of conventional tires, an apex may be included to provide support in the sidewall near the bead. In the case of runflat tires, one or more runflat inserts may be included in the sidewall to provide support in the event of a tire deflation.

These sidewall inserts, both apexes and runflat inserts, are typically of nonuniform cross-section with a relatively thick section and one or more relatively thin sections. Cure of the inserts is problematic owing to the uneven heat transfer in the thick and thin sections. It would then be advantageous to have a more evenly cured sidewall insert.

SUMMARY OF THE INVENTION

The present invention is directed to a pneumatic tire comprised of a circumferential tread, two spaced apart beads, and sidewalls connecting said beads and tread, wherein said tire sidewall contains at least one internal annular sidewall insert comprising at least two annular segments, the at least two annular segments comprising first and second adjacent annular segments;

wherein said first and second annular segments are disposed with an interface therebetween;

wherein each of the at least two annular segments comprises a rubber composition comprising at least one diene based rubber and at least one vulcanization modifier selected from the group consisting of $\alpha,\omega$-bis(N,N'-dihydrocarbylthiocarbamamoyldithio)alkanes, bismaleimides, and biscitraconimides; and wherein the concentration of vulcanization modifier in the first annular segment is less than the concentration of vulcanization modifier in the second annular segment.

DETAILED DESCRIPTION OF THE INVENTION

Figure 1:
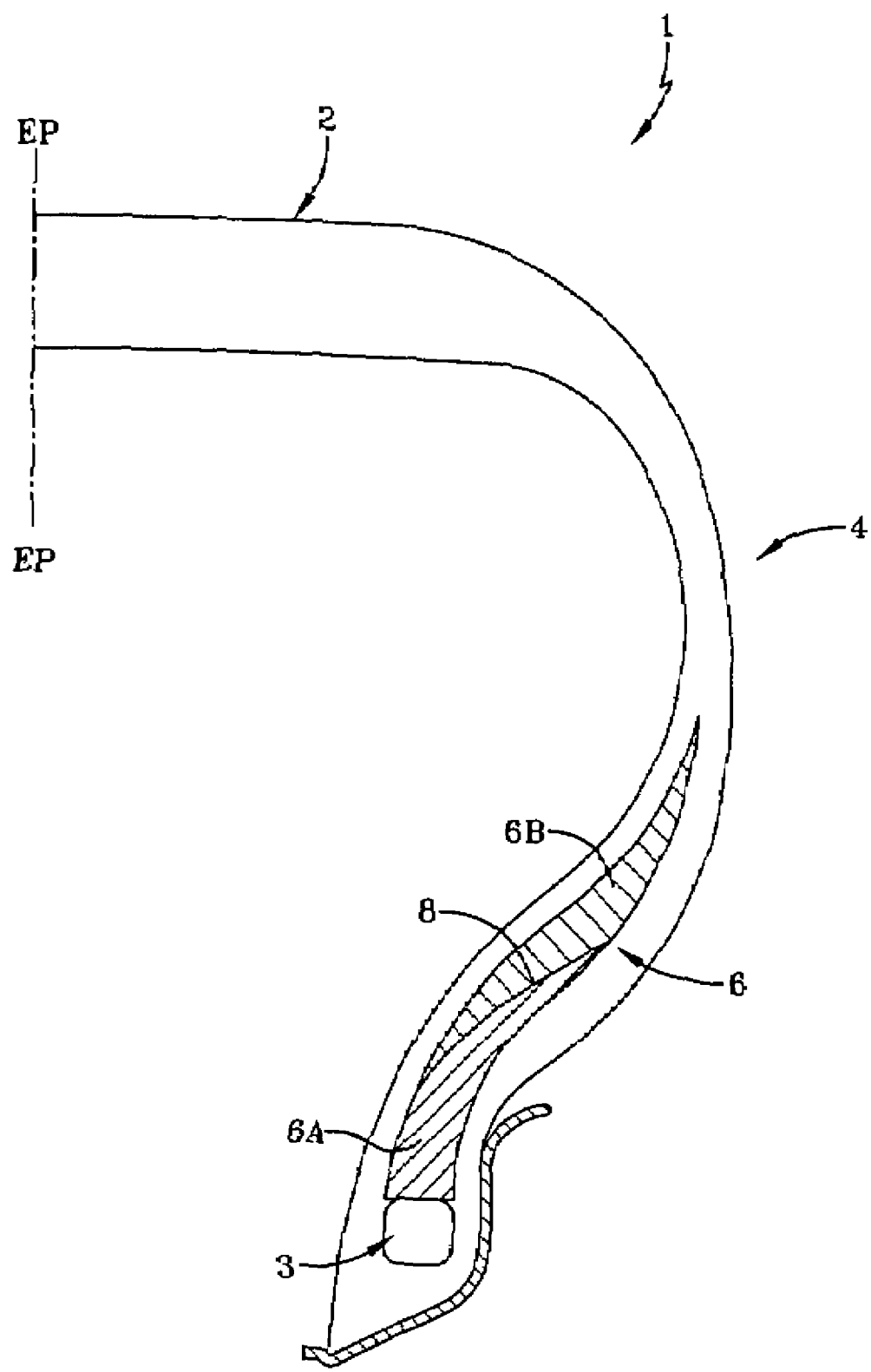
FIG. 1 is a fragmentary cross-sectional view of a tire having an apex according to the invention.

In the drawings FIGS. 1-6, a partial cross-sectional view of pneumatic tire (1) is shown with a circumferential tread (2), bead portion (3) and sidewall portion (4) extending radially outward from said bead portion (3) to said tread (2).

In FIG. 1, the sidewall portion (4) contains an internal two-segment sidewall rubber insert in a form of an apex (6). The apex (6) is of a tapered shape extending from the bead portion (3) radially outward with its apex terminating in the sidewall (4).

The apex (6) may be seen to have a relative thick section at its base proximate to the bead (3) and taper to a relatively narrow section at its opposite end distal to the bead.

The apex (6) is composed of, or configured as, two overlapping rubber segments, namely:

(A) a first segment (6A) as a radially inner component of the apex (6) extending radially outward from the bead portion (3), and (B) a second segment (6B) as a radially outer component of the apex (6) extending radially outward from said inner segment (6A) further into said sidewall portion (4);

wherein said inner segment (6A) and said outer segment (6B) are in an overlapping configuration with a diagonal interface (8) therebetween forming an overlapping zone.

Figure 2:
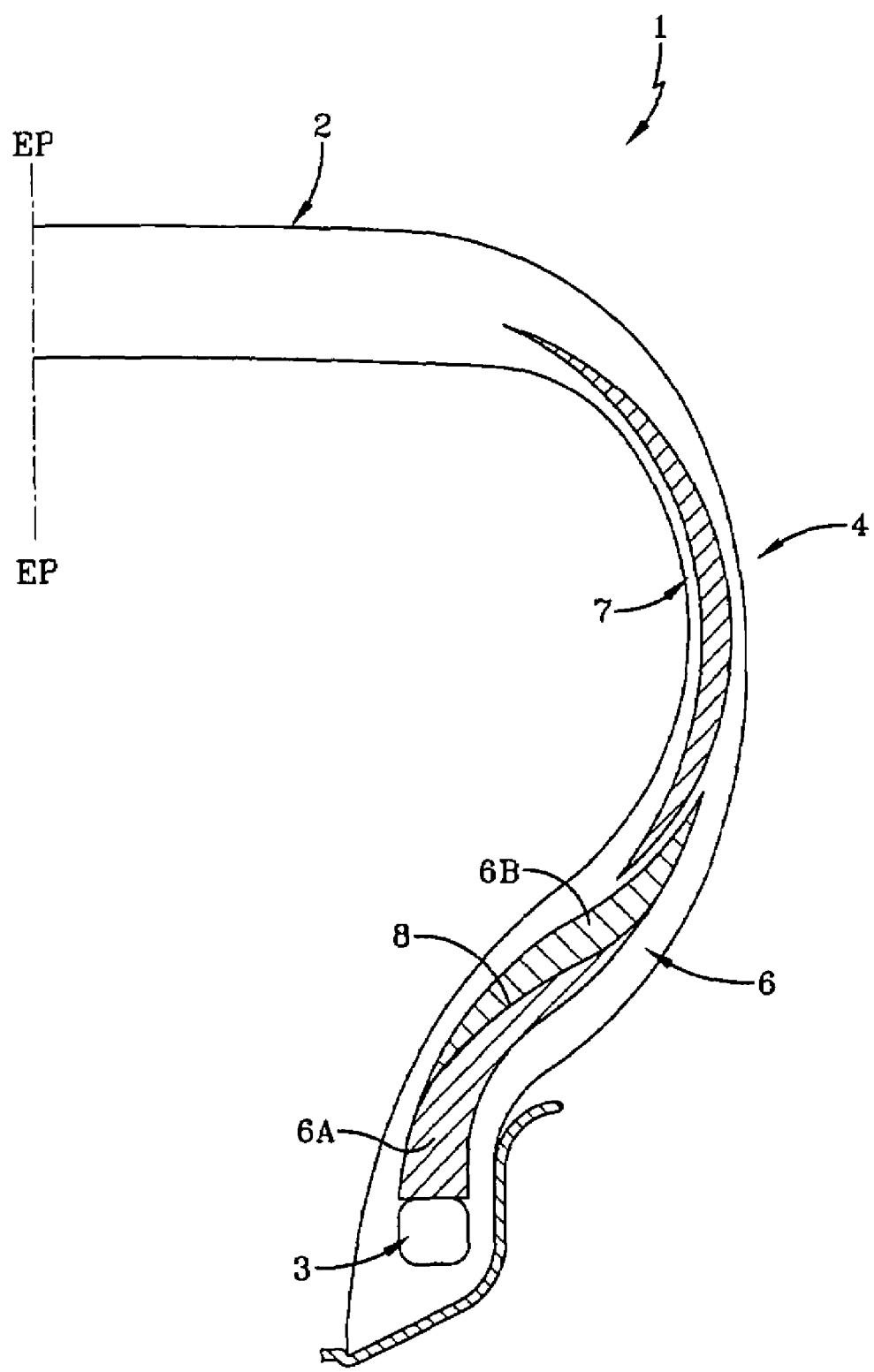
FIG. 2 is a fragmentary cross-sectional view of a tire having an apex according to the invention.

In FIG. 2, the sidewall portion (4) contains the two-segment apex (6) of FIG. 1 together with an additional, spaced apart, sidewall insert (7) spaced apart from and extending radially outward from the apex (6) in an overlapping relationship with the apex (6) in which the spaced apart overlapping portion of the spaced apart sidewall insert (7) is axially inward of the apex (6).

Figure 3:
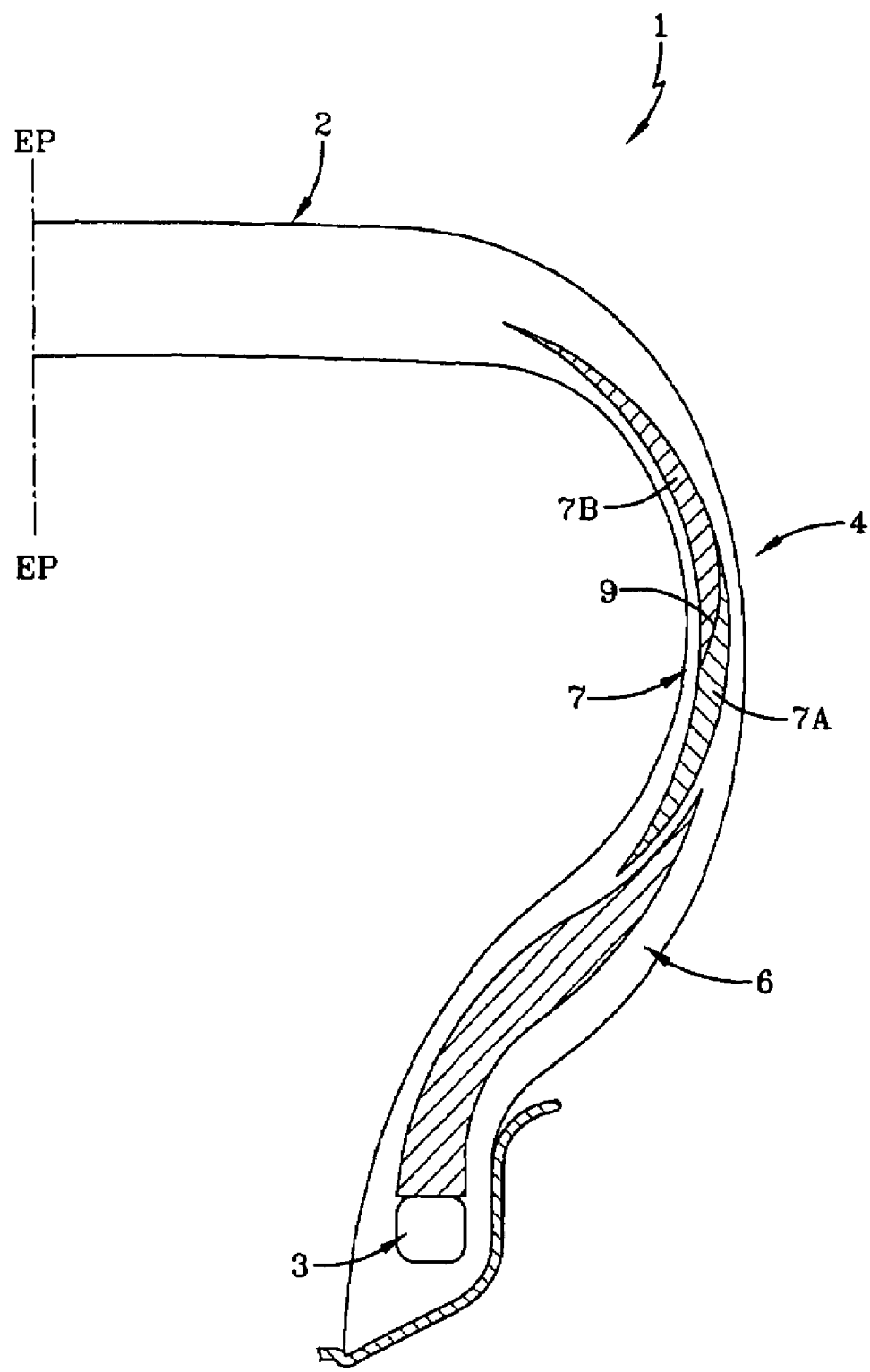
FIG. 3 is a fragmentary cross-sectional view of a tire having a runflat insert according to the invention.

In FIG. 3, the sidewall portion (4) contains a sidewall apex (6) similar in shape to the two-segment apex (6) of FIG. 1 except that the apex is of a unitary rubber composition, together with a an additional spaced-apart sidewall insert (7) of the shape and positioning as the additional spaced-apart sidewall insert (7) of FIG. 2 except that the spaced-apart sidewall insert for FIG. 3 is composed of a two-segment insert, namely a radially inner segment (7A) and a radially outer segment (7B).

In particular, the spaced apart sidewall insert (7) is composed of, or configured as, two overlapping rubber segments, namely:

(A) a first segment (7A) as a radially inner component of the insert, and (B) a second segment (7B) as a radially outer component of the sidewall insert (7) extending radially outward from said inner segment (7A) further into said sidewall portion (4) and approaching a tread portion (2) of the tire (1);

wherein said radially inner segment (7A) and said radially outer segment (7B) are in an overlapping configuration with a diagonal interface (9) therebetween forming an overlapping zone.

Figure 4:
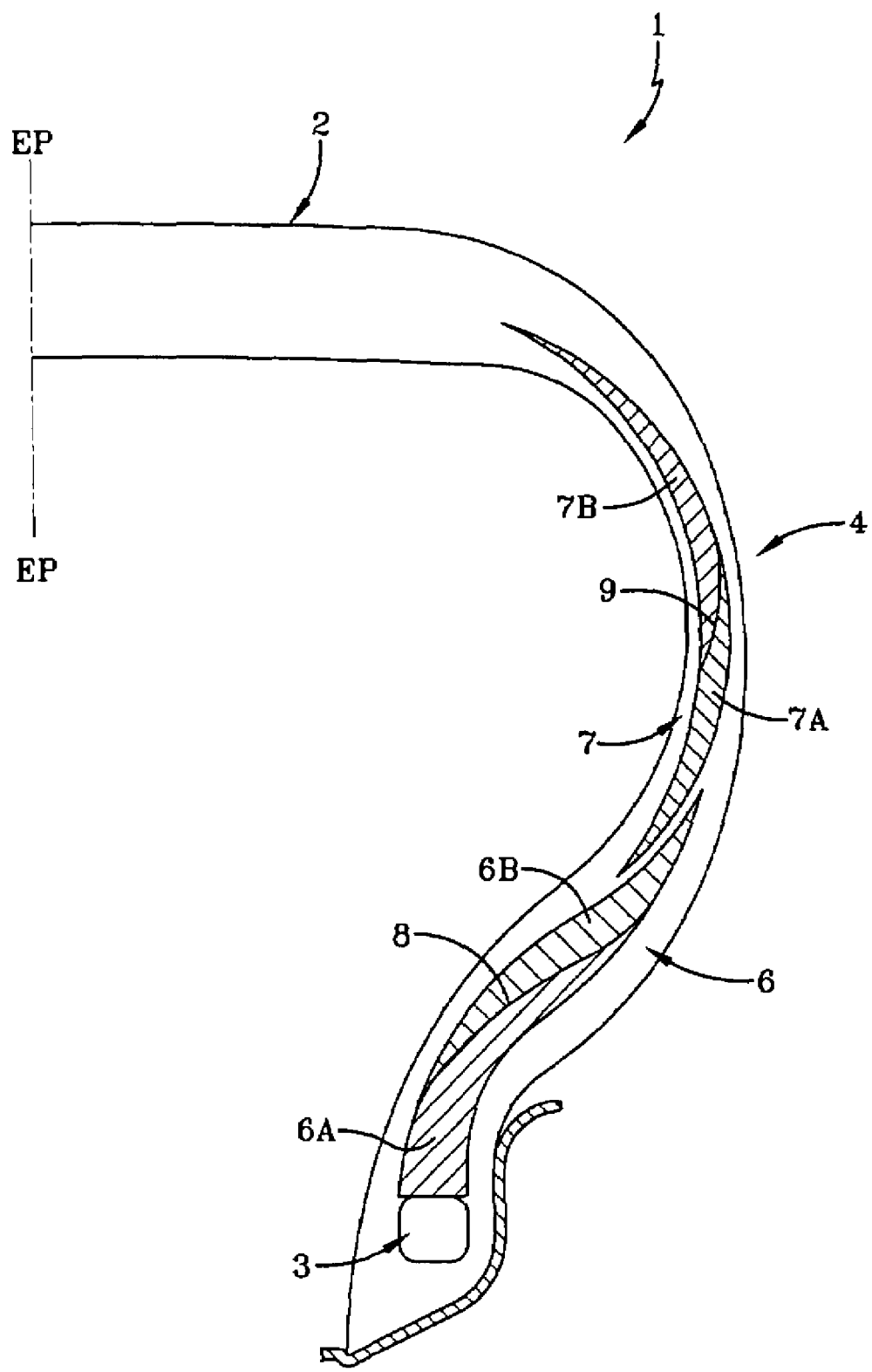
FIG. 4 is a fragmentary cross-section view of a tire having an apex and runflat insert according to the invention.

In FIG. 4, the sidewall portion (4) contains the two-segment sidewall apex (6) of the shape, positioning and composition of the apex (6) of FIG. 2 and the spaced apart two segmented sidewall rubber insert (7) of the shape, positioning and composition of the spaced apart sidewall rubber insert (7) of FIG. 3.

Figure 5:
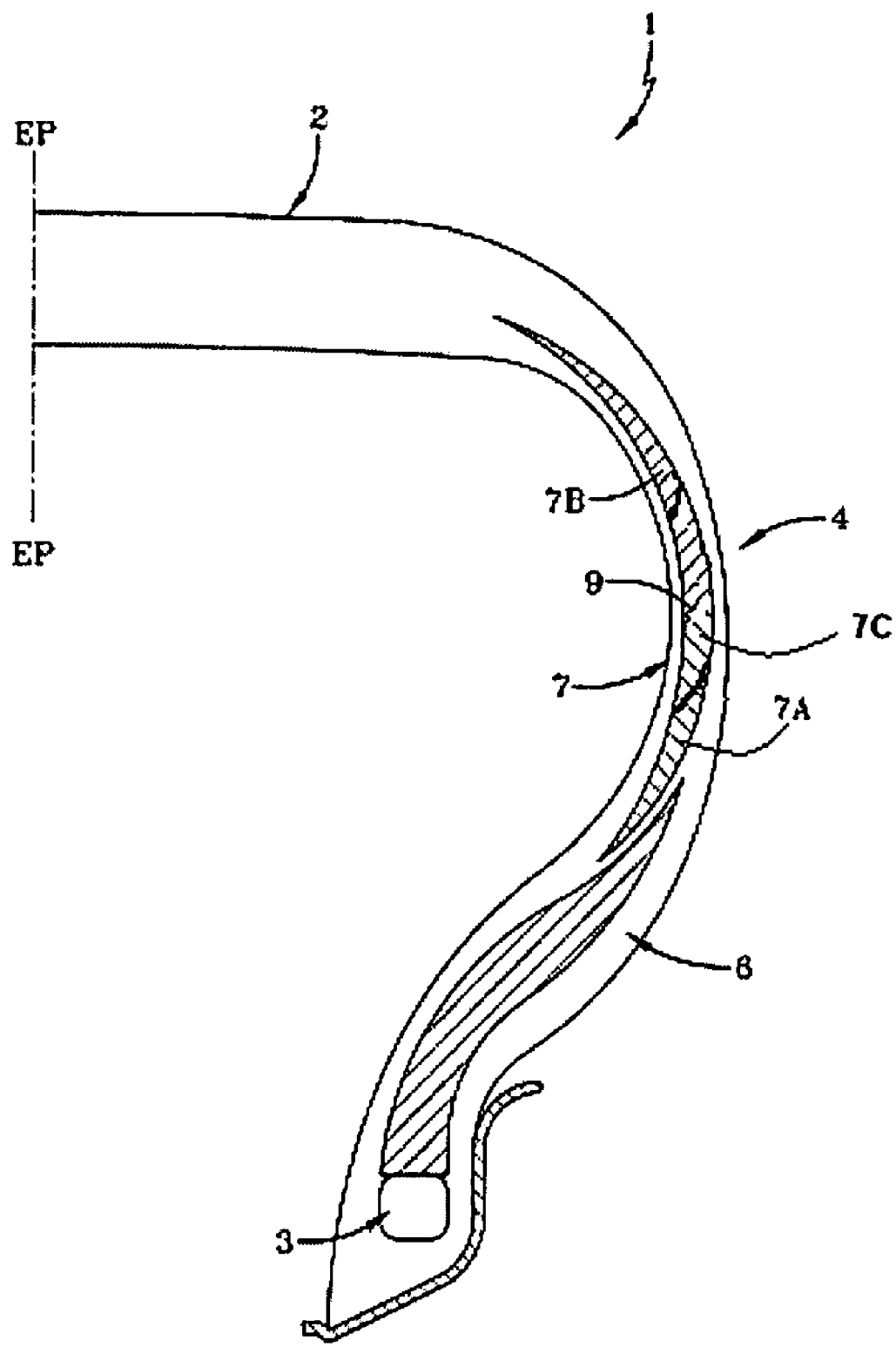
FIG. 5 is a fragmentary cross-sectional view of a tire having a runflat insert according to the invention

In FIG. 5, the sidewall portion (4) contains a sidewall apex (6) similar in shape to the two-segment apex (6) of FIG. 1 except that the apex is of a unitary rubber composition, together with a an additional spaced-apart sidewall insert (7) of the shape and positioning as the additional spaced-apart sidewall insert (7) of FIG. 3 except that the spaced-apart sidewall insert for FIG. 3 is composed of a three-segment insert, namely a radially inner segment (7A) and a radially outer segment (7B) and a third segment (7C) disposed between segments (7A) and (7C).

In particular, in FIG. 5 the spaced apart sidewall insert (7) is composed of, or configured as, three overlapping rubber segments, namely:

(A) a first segment (7A) as a radially inner component of the insert, (B) a second segment (7B) as a radially outer component of the sidewall insert (7), and (C) a third segment (7C) disposed between first segment (7A) and second segment (7B), with segment (7C) extending radially outward from said inner segment (7A), and second segment (7B) extending radially outward from said inner segment (7C) further into said sidewall portion (4) and approaching a tread portion (2) of the tire (1);

wherein first segment (7A) and third segment (7C) are in an overlapping configuration with a diagonal interface (9) therebetween forming an overlapping zone, and third segment (7C) and second segment (7B) are in an overlapping configuration with a diagonal interface (9) therebetween forming an overlapping zone.

Figure 6:
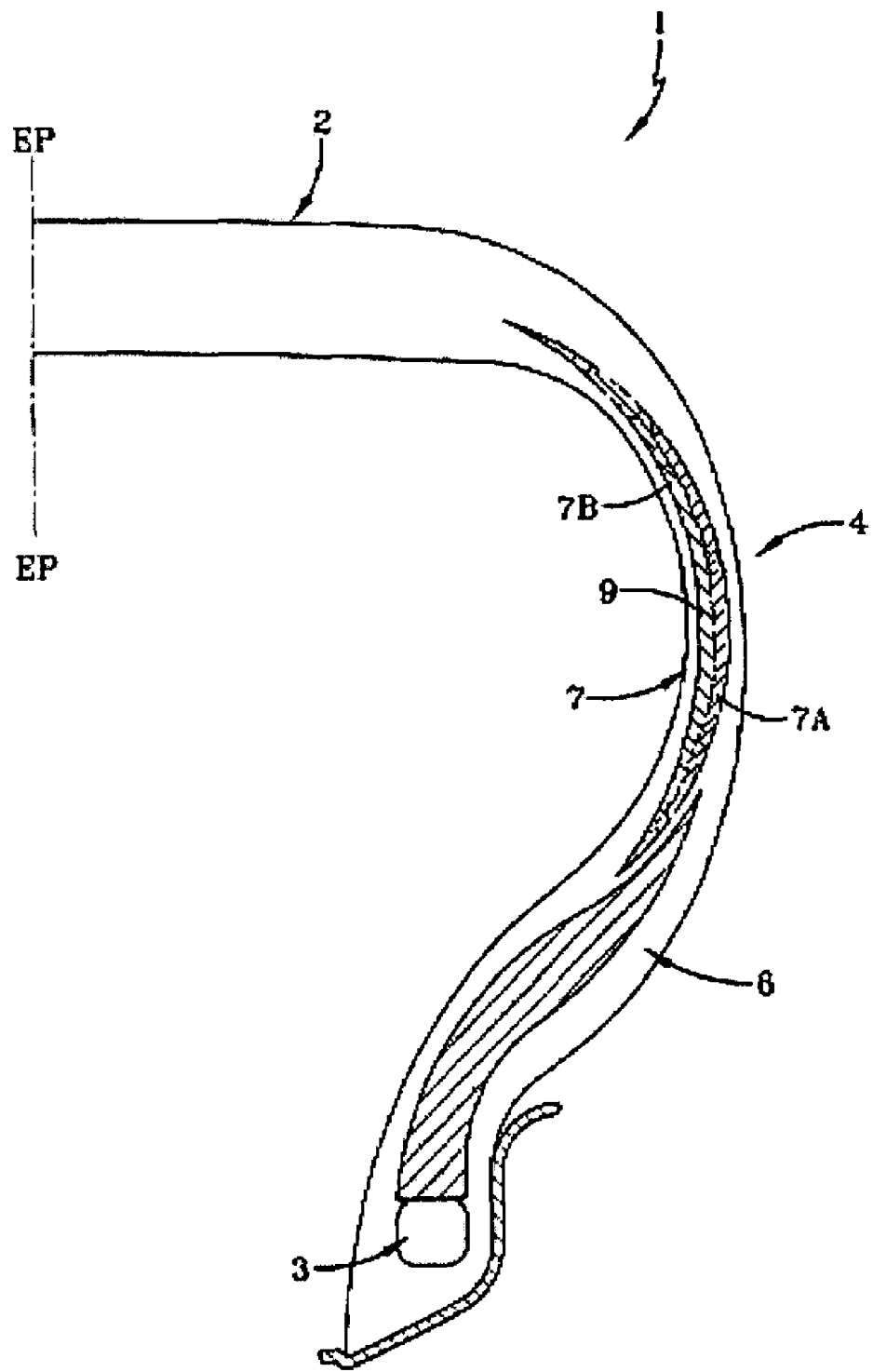
FIG. 6 is a fragmentary cross-sectional view of a tire having a runflat insert according to the invention.

In FIG. 6, the sidewall portion (4) contains a sidewall apex (6) similar in shape to the two-segment apex (6) of FIG. 1 except that the apex is of a unitary rubber composition, together with a an additional spaced-apart sidewall insert (7) of the shape and positioning as the additional spaced-apart sidewall insert (7) of FIG. 2 except that the spaced-apart sidewall insert for FIG. 6 is composed of a two-segment insert, namely an axially inner segment (7A) and a axially outer segment (7B).

In particular, in FIG. 6 the spaced apart sidewall insert (7) is composed of, or configured as, two overlapping rubber segments, namely:

(A) a first segment (7A) as an axially inner component of the insert, and (B) a second segment (7B) as an axially outer component of the sidewall insert (7) disposed axially outward from said inner segment (7A) in said sidewall portion (4);

wherein said axially inner segment (7A) and said axially outer segment (7B) are in an overlapping configuration with an interface (9) therebetween.

While the embodiment shown in FIG. 6 shows two segments in the insert (7), other embodiments are contemplated wherein more than two segments may be used, for example, a third segment (not shown) may be disposed axially outward of segment (7B).

For consideration of these drawings, a cord reinforced rubber ply (not shown) is envisioned for the Figures which is contained in the sidewall (4) and extends from the bead portion (3) through the crown portion of the tire (not identified in the drawing) radially inward of the tire tread portion (2) to the opposite bead portion (not shown) of the tire. For FIGS. 2, 3, 4, 5, and 6 it is envisioned that the ply is positioned between said apex (6) and said spaced apart sidewall rubber insert (7) in which the spaced apart sidewall rubber insert is thereby positioned adjacent to and axially inward from the ply. For all of the Figures, the apex (6) is envisioned as being positioned adjacent to and axially outward from the ply. The ply is envisioned as extending to the axially inward side of the bead (3) and apex (6), then around the radially inward part of the bead portion (3) to thereafter, in what is typically referred to as a ply turn-up portion, extending to the axially outward side of the bead portion (3) and apex (6) for a relatively short distance radially outward into the tire sidewall (4). Such ply with its ply turn-up portion is well known to those having skill in such art in which the apex (6) is therefore adjacent to and axially outward of the ply and adjacent to and axially inward of the ply turn-up.

Consistent with the embodiments shown in the drawings and other embodiment not shown, there is disclosed a pneumatic tire comprised of a circumferential tread, two spaced apart beads, and sidewalls connecting said beads and tread, wherein said tire sidewall contains at least one internal annular sidewall insert comprising at least two annular segments;

wherein a portion of each of said at least two annular segments are in a overlapping configuration with each other with a diagonal interface therebetween to form at least one overlapping zone;

wherein each of the at least two annular segments comprises a rubber composition comprising at least one diene based rubber and at least one vulcanization modifier selected from the group consisting of $\alpha,\omega$-bis(N,N'-dihydrocarbylthiocarbamamoyldithio)alkanes, bismaleimides, and biscitraconimides; and wherein the concentration of vulcanization modifier in the first annular segment is less than the concentration of vulcanization modifier in the second annular segment.

In one embodiment, the sidewall insert is an apex extending from a bead radially outward into the tire sidewall, wherein the first annular segment is disposed radially proximate to the bead and the second annular segment is disposed radially distal to the bead.

In one embodiment, the sidewall insert is a runflat insert spaced radially apart from an apex.

In one embodiment, to obtain a more uniform cure in the sidewall insert, at least one vulcanization modifier may be added to the rubber composition in one or more of the annular segments of the sidewall insert. By "vulcanization modifier", it is meant that such a vulcanization modifier will have the effect of affecting the vulcanization of the rubber composition during the normal cure cycle of the tire, such that the cure state of the overall sidewall insert is more uniform. Generally, the insert segment disposed in the region of greatest sidewall thickness will have the least amount of modifier, since the modifiers generally have the effect of slowing cure. Thus, in one embodiment, the at least two annular segments are in disposed in sidewall regions having cross-sectional thicknesses; wherein a first of said annular segments is disposed in a sidewall region having a cross-sectional thickness that is greater than the greatest cross-sectional thickness of the sidewall region wherein a second of said annular segments is disposed.

A cured rubber composition, for the purposes of the discussion for this invention, is a sulfur cured rubber composition, conventionally a sulfur cured diene-based rubber, which has been cured to a substantial inflection of its modulus (y axis) versus time (x axis) curve. Depending on the method used to measure the cure kinetics, a property related to modulus, such as torque, may be used. In particular, such curve conventionally is a curve with a positive slope which rises over time until it experiences a substantial inflection in a manner that its slope reaches a plateau where it becomes substantially horizontal. In such region of a slope transition, which is somewhat of a maximization of the slope, although the slope might still very gradually rise, it is considered that the rubber composition is fully cured. In the presence of a vulcanization modifier, the shape of the curve may be somewhat modified, depending on the modifier used. The net effect of the vulcanization modifier is to modify the vulcanization of the rubber composition in each segment of the insert such that the overall cure of the insert is more uniform.

In one embodiment, the vulcanization modifier for use in the second rubber composition include $\alpha,\omega$-bis(N,N'-dihydrocarbylthiocarbamamoyldithio)alkanes, bismaleimides, and biscitraconimides.

In one embodiment, the vulcanization modifier is a $\alpha,\omega$-bis(N,N'-dihydrocarbylthiocarbamamoyldithio)alkanes.

Suitable $\alpha,\omega$-bis(N,N'-dihydrocarbylthiocarbamamoyldithio)alkanes include 1,2-bis(N,N'-dibenzylthiocarbamoyl-dithio)ethane; 1,3-bis(N,N'-dibenzylthiocarbamoyldithio)propane; 1,4-bis(N,N'-dibenzylthiocarbamoyldithio)butane; 1,5-bis(N,N'-dibenzylthiocarbamoyl-dithio)pentane; 1,6-bis(N,N'-dibenzylthiocarbamoyldithio)hexane; 1,7-bis(N,N'-dibenzylthiocarbamoyldithio)heptane; 1,8-bis(N,N'-dibenzylthiocarbamoyl-dithio)octane; 1,9-bis(N,N'-dibenzylthiocarbamoyldithio)nonane; and 1,10-bis(N,N'-dibenzylthiocarbamoyldithio)decane. In one embodiment, the vulcanization modifier is 1,6-bis(N,N'-dibenzylthiocarbamoyldithio)hexane available as Vulcuren® from Bayer.

In one embodiment, the vulcanization modifier is a bismaleimide. Suitable bismaleimides include N,N'-m-phenylene bismaleimide, available as HVA-2 from DuPont.

In one embodiment, the vulcanization modifier is a citraconimide. Suitable citraconimidies include N,N'-m-xylylene biscitraconimide, also known as 1,3-bis(citraconimidomethyl)benzene, available as Perkalink® 900 from Flexsys.

In one embodiment, the rubber composition in one or more annular segments may comprise from about 1 to about 15 parts by weight, per 100 parts by weight of elastomer (phr), of the vulcanization modifier. In another embodiment, the rubber composition may comprise from about 2 to about 8 phr of vulcanization modifier.

In one embodiment, the amount of vulcanization modifier ranges from about 0 to about 15 parts by weight, per 100 parts by weight of elastomer.

In one embodiment, the vulcanization modifier is 1,3-bis(citraconimidomethyl)benzene.

In order to obtain a more uniform cure in the sidewall insert, the concentration of vulcanization modifier in two or more of the at least two segments will be different. In one embodiment, the weight ratio of vulcanization modifier in the first segment to vulcanization modifier in the second segment is less than 0.9; in another embodiment less than 0.8; in another embodiment less than 0.7. In one embodiment, the weight ration of 1,3-bis(citraconimidomethyl)benzene in the first segment to 1,3-bis(citraconimidomethyl)benzene in the second segment is less than 0.9; in another embodiment less than 0.8; in another embodiment less than 0.7.

In one embodiment, the amount of vulcanization modifier in the first segment ranges from 0 to 5 phr and the amount of vulcanization modifier in the second segment ranges from 1 to 15 phr.

In one embodiment the amount of 1,3-bis(citraconimidomethyl)benzene in the first segment ranges from 0 to 5 phr and the amount of 1,3-bis(citraconimidomethyl)benzene in the second segment ranges from 1 to 15 phr.

In one embodiment, the at least two annular segments further comprises a third annular segment, wherein the third annular segment is disposed radially proximate to the apex, the second annular segment is disposed radially distal from the apex, and the first annular segment is disposed radially between the first and second annular segments.

In one embodiment, the weight ratio of vulcanization modifier in the first segment to vulcanization modifier in the second segment is less than 0.9; in another embodiment, 0.8; in another embodiment, 0.7, and wherein the weight ratio of vulcanization modifier in the first segment to vulcanization modifier in the third segment is less than 0.9; in another embodiment 0.8; in another embodiment 0.7.

In one embodiment, the weight ratio of 1,3-bis(citraconimidomethyl)benzene in the first segment to 1,3-bis(citraconimidomethyl)benzene in the second segment is less than 0.9; in another embodiment, 0.8; in another embodiment, 0.7, and wherein the weight ratio of 1,3-bis(citraconimidomethyl) benzene in the first segment to 1,3-bis(citraconimidomethyl) benzene in the third segment is less than 0.9; in another embodiment 0.8; in another embodiment 0.7.

In one embodiment, the amount of vulcanization modifier in the first segment ranges from 0 to 5 phr and the amount of vulcanization modifier in the second and third segments ranges from 1 to 15 phr.

In one embodiment, the amount of 1,3-bis(citraconimidomethyl)benzene in the first segment ranges from 0 to 5 phr and the amount of 1,3-bis(citraconimidomethyl)benzene in the second and third segments ranges from 1 to 15 phr.

The present invention may be used with rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, napthenic, vegetable oils, and low PCA oils, such as MES, TDAE, SRAE and heavy naphthenic oils.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 10 to about 150 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165 MP and Z165GR and silicas available from Degussa AG with, for example, designations VN2 and VN3, etc.

The vulcanizable rubber composition may include from 1 to 100 phr of carbon black, crosslinked particulate polymer gel, ultra high molecular weight polyethylene (UHMWPE) or plasticized starch.

Commonly employed carbon blacks can be used as a conventional filler. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition for use in the tire tread may contain a conventional sulfur containing organosilicon compound. Examples of suitable sulfur containing organosilicon compounds are of the formula:

$$Z\text{-Alk-}S_n\text{-Alk-}Z \qquad\qquad II$$

in which Z is selected from the group consisting of

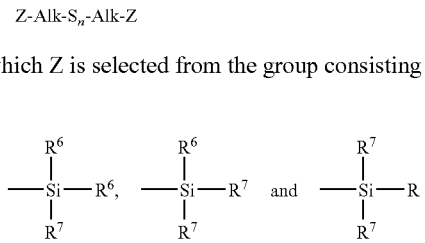

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl)disulfide, 3,3'-bis(triethoxysilylpropyl) tetrasulfide, 3,3'-bis(triethoxysilylpropyl)octasulfide, 3,3'-bis(trimethoxysilylpropyl) tetrasulfide, 2,2'-bis(triethoxysilylethyl)tetrasulfide, 3,3'-bis(trimethoxysilylpropyl) trisulfide, 3,3'-bis(triethoxysilylpropyl)trisulfide, 3,3'-bis (tributoxysilylpropyl) disulfide, 3,3'-bis(trimethoxysilylpropyl)hexasulfide, 3,3'-bis(trimethoxysilylpropyl) octasulfide, 3,3'-bis(trioctoxysilylpropyl)tetrasulfide, 3,3'-bis(trihexoxysilylpropyl) disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl) pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl) trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

In one embodiment, the sulfur containing organosilicon compounds are the 3,3'-bis(trimethoxy or triethoxy silylpropyl)sulfides. In one embodiment, the sulfur containing organosilicon compounds are 3,3'-bis(triethoxysilylpropyl)disulfide and 3,3'-bis(triethoxysilylpropyl)tetrasulfide. Therefore, as to formula II, Z may be

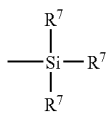

where $R^7$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. As disclosed in U.S. Pat. No. 6,608,125, these sulfur containing organosilicon compounds are of the formula G-C(=O)—S—CH$_2$CH$_2$CH$_2$SiX$_3$ wherein each X is an independently selected RO— group wherein each R is independently selected from the group consisting of hydrogen, alkyl that may or may not contain unsaturation, alkenyl groups, aryl groups, and aralkyl groups, such moieties other than hydrogen having from 1 to 18 carbon atoms, and G is a monovalent alkyl of from 6 to 8 carbon atoms. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from GE Silicones.

In another embodiment, suitable sulfur containing organosilicon compounds include those disclosed in U.S. Patent Publication 2003/0130535. As disclosed in U.S. Patent Publication 2003/0130535, these sulfur containing organosilicon compounds are of the formulas III or IV

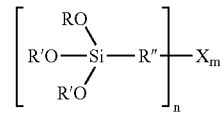

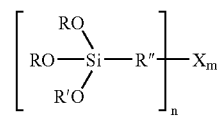

wherein: R is a methyl or ethyl group;

R' is identical or different and is a $C_9C_{30}$ branched or unbranched monovalent alkyl or alkenyl group, aryl group, aralkyl group, branched or unbranched $C_2$-$C_{30}$ alkyl ether group, branched or unbranched $C_2$-$C_{30}$ alkyl polyether group or R'''$_3$Si, where R''' is $C_1$-$C_{30}$ branched or unbranched alkyl or alkenyl group, aralkyl group or aryl group, R'' is a branched or unbranched, saturated or unsaturated, aliphatic, aromatic or mixed aliphatic/aromatic divalent $C_1$-$C_{30}$ hydrocarbon group;

X is SH where n=1 and m=1, S where n=2 and m=1-10 and mixtures thereof, S(C=O)—R''' where n=1 and m=1 or H where n=1 and m=1;

R'' may mean CH$_2$, CH$_2$CH$_2$, CH$_2$CH$_2$CH$_2$, CH$_2$CH$_2$CH$_2$CH$_2$, CH(CH$_3$), CH$_2$CH(CH$_3$), C(CH$_3$)$_2$, CH(C$_2$H$_5$), CH$_2$CH$_2$CH(CH$_3$), CH$_2$CH(CH$_3$)CH$_2$ or

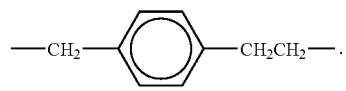

In one embodiment, the sulfur containing organosilicon compound is of formula III, R is ethyl, R' is $C_{12}$-$C_{14}$ alkyl, R'' is CH$_2$CH$_2$CH$_2$, X is SH, n is 1 and m is 1. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids such as activators, and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature (s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a sidewall insert of the runflat tire. Thus, each of the annular segments of the sidewall insert may comprises the rubber composition. The annular segments may be produced using methods as are known in the art, including but not limited to extrusion, calendaring, and the like. The first and second (and additional) annular segments may be co-extruded, or singly extruded or calendared and then used to build the tire in the usual manner.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

Example 1

Figure 7:
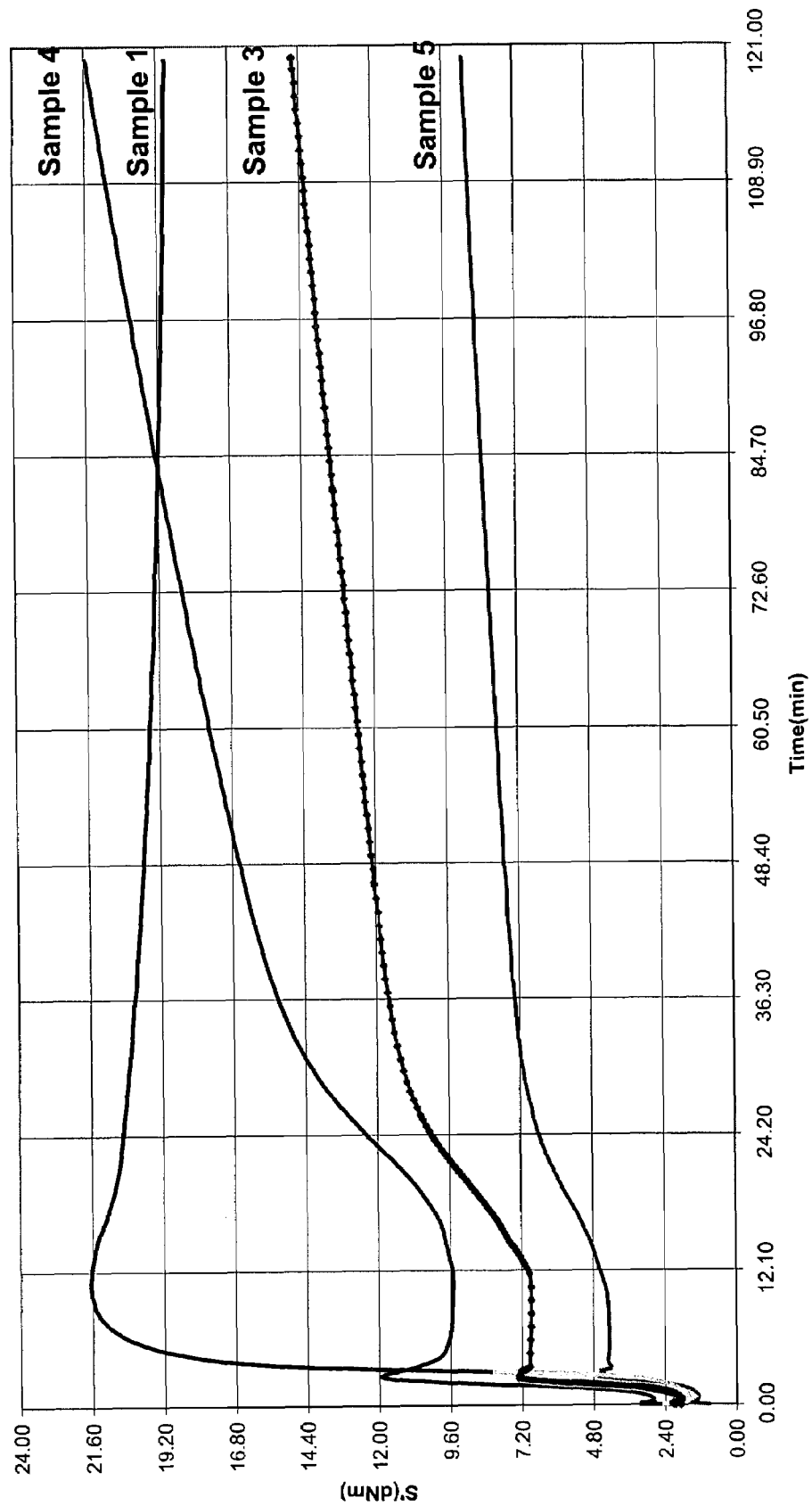
FIG. 7 is a trace of torque versus time for several rubber compositions according to the invention.

In this example, the effect of adding a vulcanization modifier to a rubber composition is illustrated. Five samples were prepared following the recipes in Table 1, with amounts given in phr. Each composition was prepared in a multistage mix procedure with at least one non-productive stage and one productive stage. The samples were then tested for cure kinetics with results as shown in FIG. 7.

TABLE 1

| | Sample | | | | |
|---|---|---|---|---|---|
| | 1 | 2 | 3 | 4 | 5 |
| Natural Rubber | 80 | 100 | 100 | 100 | 100 |
| Polybutadiene[1] | 20 | 0 | 0 | 0 | 0 |
| Carbon Black | 30 | 32 | 32 | 50 | 10 |
| Silica | 15 | 0 | 0 | 0 | 0 |
| Coupling Agent[2] | 5 | 0 | 0 | 0 | 0 |
| Antidegradants[3] | 3.25 | 3 | 3 | 3 | 3 |
| Zinc Oxide | 5 | 2.5 | 2.5 | 2.5 | 2.5 |
| Stearic Acid | 1 | 1 | 1 | 1 | 1 |
| Sulfur | 3 | 2 | 2 | 2 | 2 |
| Accelerators[4] | 4.75 | 2 | 2 | 2 | 2 |
| Vulcanization Modifier[5] | 0 | 4 | 8 | 10 | 8 |
| Vulcanization Modifier[6] | 0 | 0 | 0 | 0.1 | 0 |

[1]Budene 1207 from The Goodyear Tire & Rubber Company
[2]bis (alkoxysilylalkyl)polysulfide type, 50% on carbon black
[3]p-phenylene diamines and quinolines
[4]sulfenamides
[5]1,3-bis(citraconimidomethyl)benzene
[6]N-cyclohexylthiophthalimide While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprised of a circumferential tread, two spaced apart beads, and sidewalls connecting said beads and tread, wherein said tire sidewall contains at least one internal annular sidewall insert comprising at least two annular segments, the at least two annular segments comprising first and second adjacent annular segments;

wherein said first and second annular segments are disposed with an interface therebetween;

wherein the sidewall insert is a runflat insert spaced radially apart from an apex;

wherein the first and second annular segments are disposed in a configuration selected from the group consisting of a) the first annular segment is disposed axially inward of the second annular segment, and b) the first annular segment is disposed radially proximate to the apex and the second annular segment is disposed radially distal to the apex;

wherein each of the at least two annular segments comprises a rubber composition comprising at least one diene based rubber and at least one vulcanization modifier selected from the group consisting of $\alpha,\omega$-bis(N,N'-dihydrocarbylthiocarbamamoyldithio)alkanes, bismaleimides, and biscitraconimides; and wherein the concentration of vulcanization modifier in the first annular segment is less than the concentration of vulcanization modifier in the second annular segment.

2. The pneumatic tire of claim 1, wherein the amount of vulcanization modifier ranges from about 0 to about 15 parts by weight, per 100 parts by weight of elastomer.

3. The pneumatic tire of claim 2, wherein the vulcanization modifier is 1,3-bis(citraconimidomethyl)benzene.

4. The pneumatic tire of claim 3, wherein the weight ratio of 1,3-bis(citraconimidomethyl)benzene in the first segment to 1,3-bis(citraconimidomethyl)benzene in the second segment is less than 0.9.

5. The pneumatic tire of claim 3, wherein the weight ratio of 1,3-bis(citraconimidomethyl)benzene in the first segment to 1,3-bis(citraconimidomethyl)benzene in the second segment is less than 0.8.

6. The pneumatic tire of claim 3, wherein the weight ratio of 1,3-bis(citraconimidomethyl)benzene in the first segment to 1,3-bis(citraconimidomethyl)benzene in the second segment is less than 0.7.

7. The pneumatic tire of claim 4, wherein the amount of 1,3-bis(citraconimidomethyl)benzene in the first segment ranges from 0 to 5 phr and the amount of 1,3-bis(citraconimidomethyl)benzene in the second segment ranges from 1 to 15 phr.

8. The pneumatic tire of claim 5, wherein the amount of 1,3-bis(citraconimidomethyl)benzene in the first segment ranges from 0 to 5 phr and the amount of 1,3-bis(citraconimidomethyl)benzene in the second segment ranges from 1 to 15 phr.

9. The pneumatic tire of claim 6, wherein the amount of 1,3-bis(citraconimidomethyl)benzene in the first segment ranges from 0 to 5 phr and the amount of 1,3-bis(citraconimidomethyl)benzene in the second segment ranges from 1 to 15 phr.

10. The pneumatic tire of claim 1, wherein the rubber compositions each comprise at least one elastomer selected from the group consisting of emulsion polymerized styrene/butadiene copolymers, solution polymerized styrene/butadiene copolymers, natural rubber, cis 1,4-polybutadiene, synthetic cis 1,4-polyisoprene, styrene/isoprene copolymers, 3,4-polyisoprene, isoprene/butadiene copolymers, medium vinyl polybutadiene (20 percent to 60 percent by weight of vinyl units), styrene/isoprene/butadiene terpolymers, butyl rubber, polychloroprene, acrylonitrile/butadiene copolymers and ethylene/propylene/diene terpolymers.

11. The pneumatic tire of claim 1, wherein the at least two co-annular segments further comprises a third annular segment.

12. The pneumatic tire of claim 11, where the third annular segment is disposed axially outward of the first and second annular segments.

13. The pneumatic tire of claim 11, wherein the third annular segment is disposed radially distal to the first and second annular segments.

* * * * *